United States Patent [19]
Ninneman

[11] 3,768,944
[45] Oct. 30, 1973

[54] FLOATING PARISON MOLD FOR INJECTION BLOW-MOLDING MACHINE

[75] Inventor: Lawrence D. Ninneman, Toledo, Ohio

[73] Assignee: Owens-Illinois, Inc., Toledo, Ohio

[22] Filed: Jan. 31, 1972

[21] Appl. No.: 222,128

[52] U.S. Cl.............425/242 B, 425/Dig. 205, 425/Dig. 209, 425/Dig. 211
[51] Int. Cl............................................ B29d 23/03
[58] Field of Search ............ 425/242, 242 B, 302 B, 425/305 B, 324 B, 326 BJ, DIG. 205, DIG. 209, DIG. 211

[56] References Cited
UNITED STATES PATENTS

| | | | |
|---|---|---|---|
| 3,441,982 | 5/1969 | Sagara et al.................... | 425/242 B |
| 3,659,995 | 5/1972 | LaGrutta........................ | 425/242 B |
| 2,903,740 | 9/1959 | Farfrey.......................... | 425/305 B X |
| 3,616,491 | 11/1971 | Vellers........................... | 425/324 B X |
| 3,019,480 | 2/1962 | Soubier........................ | 425/324 B UX |

FOREIGN PATENTS OR APPLICATIONS

1,217,597 5/1966 Germany ............................ 425/242

*Primary Examiner*—H. A. Kilby, Jr.
*Attorney*—Philip M. Rice et al.

[57] ABSTRACT

An injection blow-molding machine or the like wherein a split, open-ended parison mold is provided by mold halves actuated on separate carriers to and from a closed mold-defining position over an injection orifice. An upper neck mold is moved downwardly against the parison mold halves to clamp the parison mold halves between the neck mold and the orifice. The parison molds and their carriers are supported for a lateral movement on slide elements which are vertically displaceable to compensate for thermal expansion and contraction of the mold elements during molding, thus insuring the injection molding of a flash-free parison, despite such thermal variations.

7 Claims, 7 Drawing Figures

FLOATING PARISON MOLD FOR INJECTION BLOW-MOLDING MACHINE

BACKGROUND OF THE INVENTION

This invention relates to an injection blow-molding machine of the type wherein a "parison" or blank is injection-molded in a "parison mold." The parison mold consists of two mold halves which are mounted on carriers or "platens," respectively, the mold halves being laterally movable relative to one another and relative to a fixed injection orifice.

After the parison mold halves are actuated to their closed position in vertical alignment with the injection orifice, a neck ring head is lowered into contact with the parison molds, the neck ring head being axially aligned vertically with the injection orifice. The neck ring head is forced downwardly toward the injection orifice to "clamp" or urge the parison molds tightly against the orifice and to urge the neck ring head tightly against the upper open end of the parison molds. Following such "clamping," the parison mold, while closed, is filled with plasticized material from the injection orifice, and the plasticized material is hardened to a self-sustaining state interiorally of the closed mold. After hardening, the parison molds are opened laterally as the neck ring head is elevated from the orifice and the parison is lifted from the injection molding station and transferred to a blow-molding station.

During the injection molding operation, it is critical that the neck ring head, the parison mold halves and the injection orifice be held in extremely tight, clamped relationship. If these elements are not clamped together with sufficient force, the plasticized material will be forced between the multiple mold elements and a "fin" or flash projection will be produced at the imperfect point of juncture of the mold elements.

In the past, some difficulty has been encountered in the elimination of fins or flash, since the relationship between the parison mold halves, the orifice, and the neck mold have been fixed dimensionally, and these parts could not move relative to one another under the clamping pressure exerted by the neck mold.

As the molding operation proceeds, certain thermal changes occur with the mold elements either gaining or losing heat during the performance of the various operations of clamping, injection molding, separating, blow molding and the like. Such dimensional changes have resulted in a variance in the dimensions of the parts, and the parts will deviate from their nominal, cold dimensions. It is impossible to predict such changes or to compensate for these changes in the original mold design. Also, where differing materials are utilized in the same mold, the molding temperature may vary considerably. Such temperature changes have required in the past, dimensional changes in the mold. Furthermore, in originally designing the tooling it is impossible to completely predict the operating temperature of all the mold components, thus making precise dimensioning of such components a matter of calculated judgment. The present invention renders less critical the precise dimensioning of such mold components.

The result has been the formation of fins or flash at the juncture of the various mold parts. The occurrence of such fins or flash may well prevent the parison from being properly blown in the performance of the blow molding step, the appearance of the resultant container is harmed, and the parison molds and neck mold must be disassembled so that the mating surfaces between the parison mold halves and the orifice cap and between the neck mold and the parison mold halves can be cleaned off.

BRIEF DESCRIPTION OF THE PRESENT INVENTION

The present invention now provides a novel solution to the problems of (1) fin or flash formation during the injection molding of a parison in a multi-part parison mold and (2) the utilization of a parison mold for the molding of differing materials without the necessity of dimensionally changing the mold, while (3) facilitating original start-up of the new mold, and (4) rendering less critical the dimensioning of the mold components.

More specifically, this invention provides a floating parison mold half holder or platen which is vertically, as well as laterally, shiftable to permit dimensional compensation for those thermal changes which invariably occur during the injection molding of the parison. By permitting vertical motion of the parison mold toward the injection orifice under the thrust of the neck mold, true abutment is always obtained between the various mold elements, and this abutment can be retained despite those inevitable, inherent dimensional changes, due to thermal variations, which occur during the molding operation.

In greater detail, the mold halves are each mounted on a holder or platen driven by a power means to and from a central position at which the parison mold halves abut one another, while also contacting an orifice block which is fixed in vertical alignment with the parison mold cavity when the parison mold halves are closed. The neck ring mechanism is vertically aligned with the orifice block and is displaced vertically by a second power mechanism. When the neck mold head is lowered, it contacts the parison mold halves under pressure and vertically clamps the parison mold halves between the orifice block and the neck mold. Because of thermal variations during the molding cycle, dimensional changes occur in each of the elements of the assembled parison mold, i.e., the orifice block, the parison mold halves and the neck mold. These dimensional variations will cause an imperfect joint between various mold elements, unless the mold elements are free to move under the pressure of the neck mold head.

In accordance with the present invention, the parison mold platens are mounted on vertically shiftable supports capable of supporting the platens and the neck mold halves for transverse movement as well. This vertical shifting capability of the parison mold platens enables vertical motion of the parison halves under the thrust of the neck mold head power means, and a tight joint between the parison mold halves and the orifice block and the neck mold is always insured. Of course, the vertical adjustment feature of the parison mold can also be utilized in an injection mold.

OBJECTS

It is, therefore, an important object to the present invention to provide a multi-part injection mold, such as a parison mold, wherein various parts of the mold are shiftable relative to one another to insure accurate clamping together of the mold elements despite dimensional changes due to thermal variations.

Another important object to the present invention is the provision of an improved parison mold support mechanism for an injection blow-molding machine, in which the parison mold halves are separately mounted on individually vertically displaceable platens, so that the parison mold halves will be snugly abutted with an injection nozzle and a neck mold head to compensate for thermal changes occurring during the molding cycle.

Yet another, and no less important, object of the present invention is the provision of an improved injection blow-molding machine wherein split parison mold halves are supported for lateral movement to and from a mold-closed position on vertically displaceable slide elements, so that the parison mold halves will be firmly clamped between an injection nozzle and a neck mold under the vertical thrust of the neck mold actuating mechanism.

ON THE DRAWINGS

AS SHOWN ON THE DRAWINGS

Figure 1:
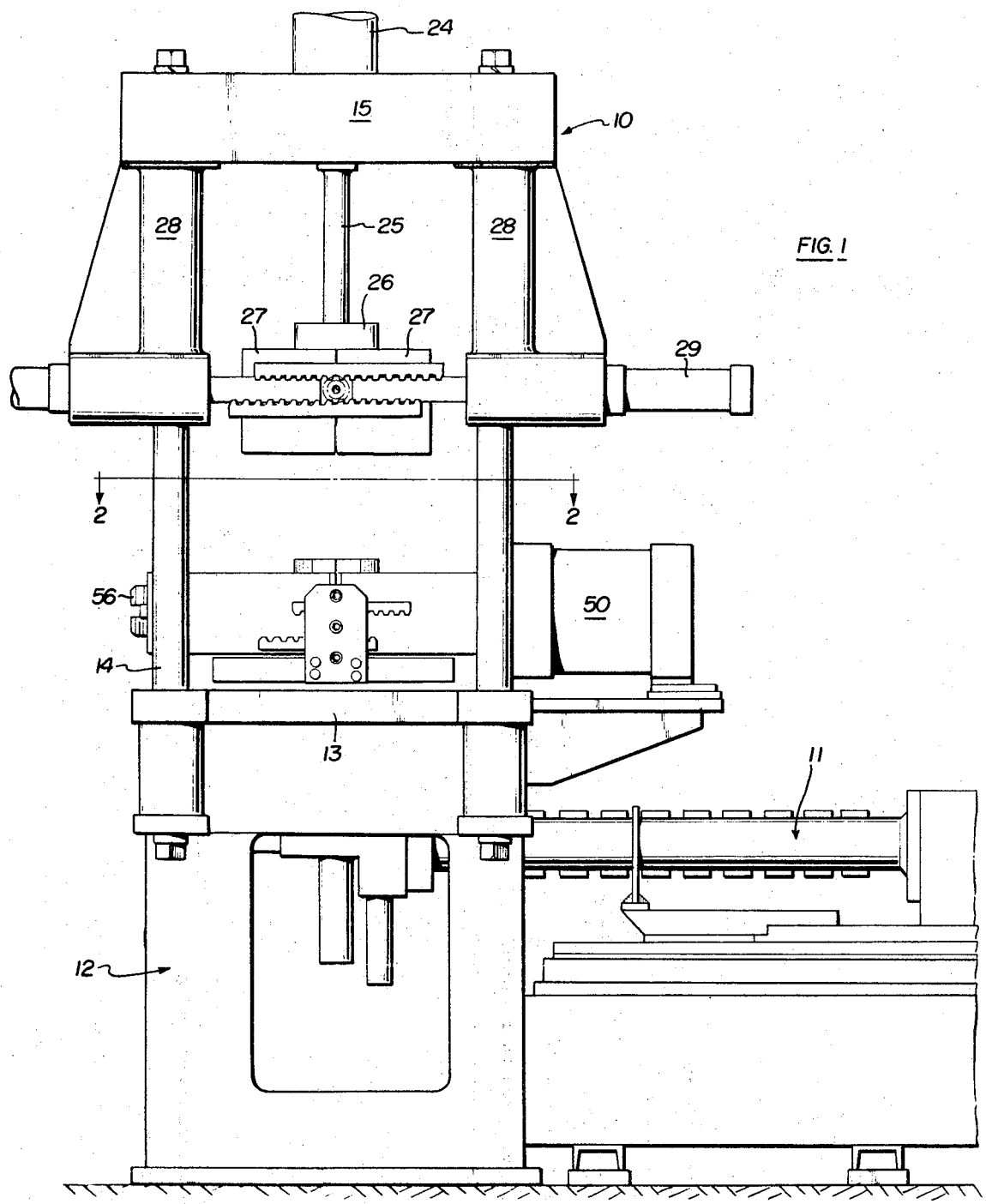
FIG. 1 is a side elevational view of a complete injection blow-molding machine incorporating the invention herein set forth.

FIG. 1, reference numeral 10, refers generally to an injection blow-molding machine incorporating therein the present invention. Generally, this machine 10 comprises a source of plasticized thermoplastic material under pressure, such as a reciprocating screw extruder 11 located laterally to one side of a machine base 12 having an upper base plate 13. From this base plate 13 four guide rods 14 project upwardly to support an upper support plate 15.

Figure 7:
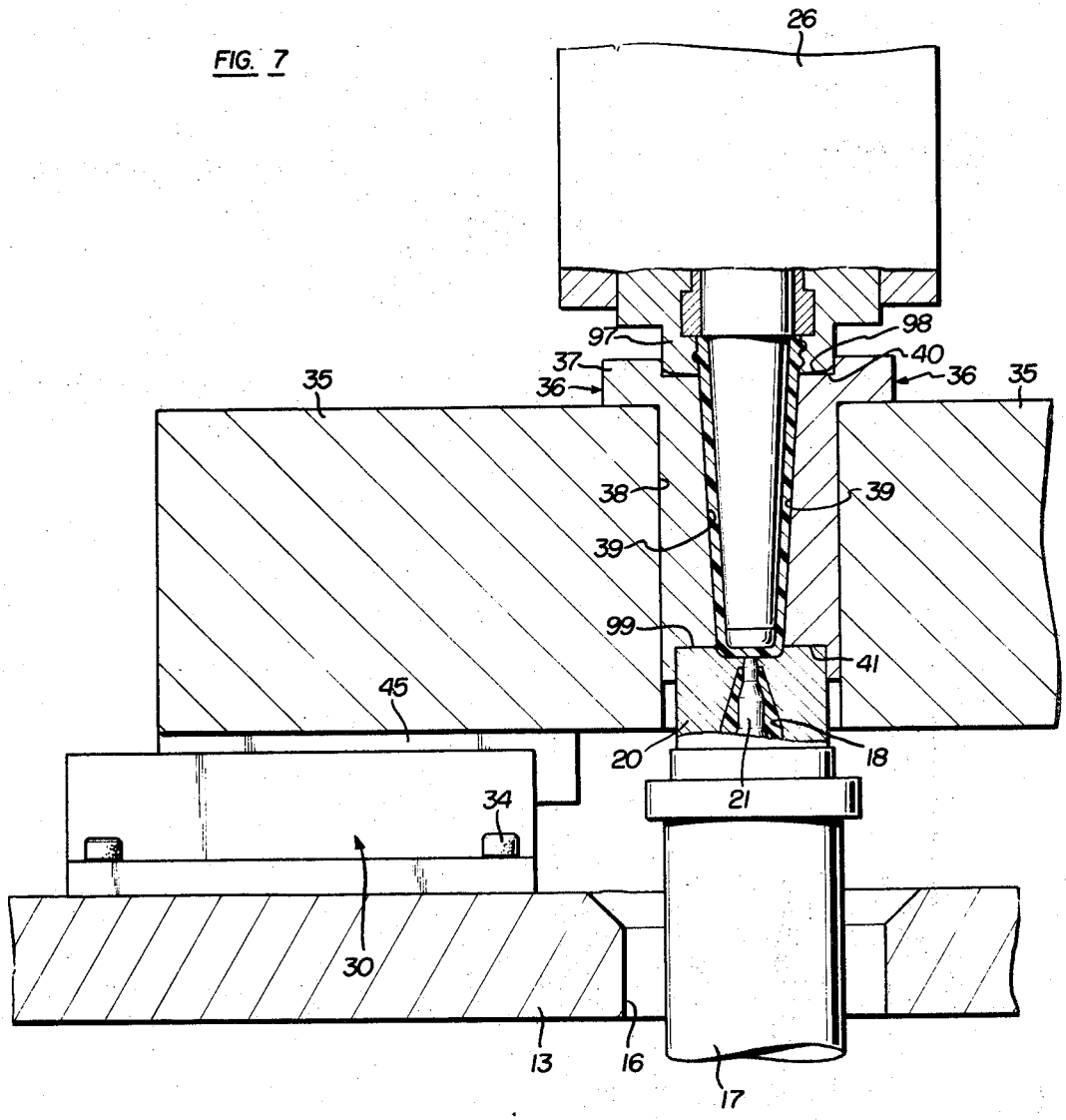
FIG. 7 is a fragmentary enlarged sectional view taken along the plane 7—7 of FIG. 2.

As shown in FIG. 7, the base plate 13 has a central aperture 16 through which projects a vertical orifice tube 17 provided with an axial opening 18 through which plasticized material from the extruder 11 issues through an orifice block 20 under the control of a vertically reciprocable orifice pin 21. The orifice block 20 of FIG. 7 is preferably one of a series of such blocks which are mounted in transverse alignment on the plate 13, four such blocks 20 being illustrated in FIG. 2.

Mounted upon the upper frame element 15 is a double acting fluid pressure cylinder 24 having an actuating piston (not shown) carrying a depending piston rod 25, having at its lower end a neck mold block 26 illustrated in detail in FIG. 7 and hereinafter described. Actuation of this cylinder 24 will move the neck mold block 26 between a lowered position (illustrated in FIG. 7) and an upper blow-molding position illustrated in FIG. 1. The block 26 is elongated transversely to provide four sets of neck molds for cooperation with the series of orifice blocks 20 (FIG. 2), and a pair of separable blow-mold sections 27 are provided for cooperation with each set of neck molds carried by the head 26 (FIG. 1).

The blow-molds 27 are mounted on tubular supports 28 carried by the vertical guide rods 14, and blow-mold actuating cylinders 29 are provided to open and close the blow-mold halves 27 on the injection mold parisons. Since the present invention is concerned with the formation of the injection molded parison and not the blow-molding of the parison to its final configuration, a detailed description of the blow-molds and the blow-molding operation is not essential to the present invention and is not included herein.

Figure 2:
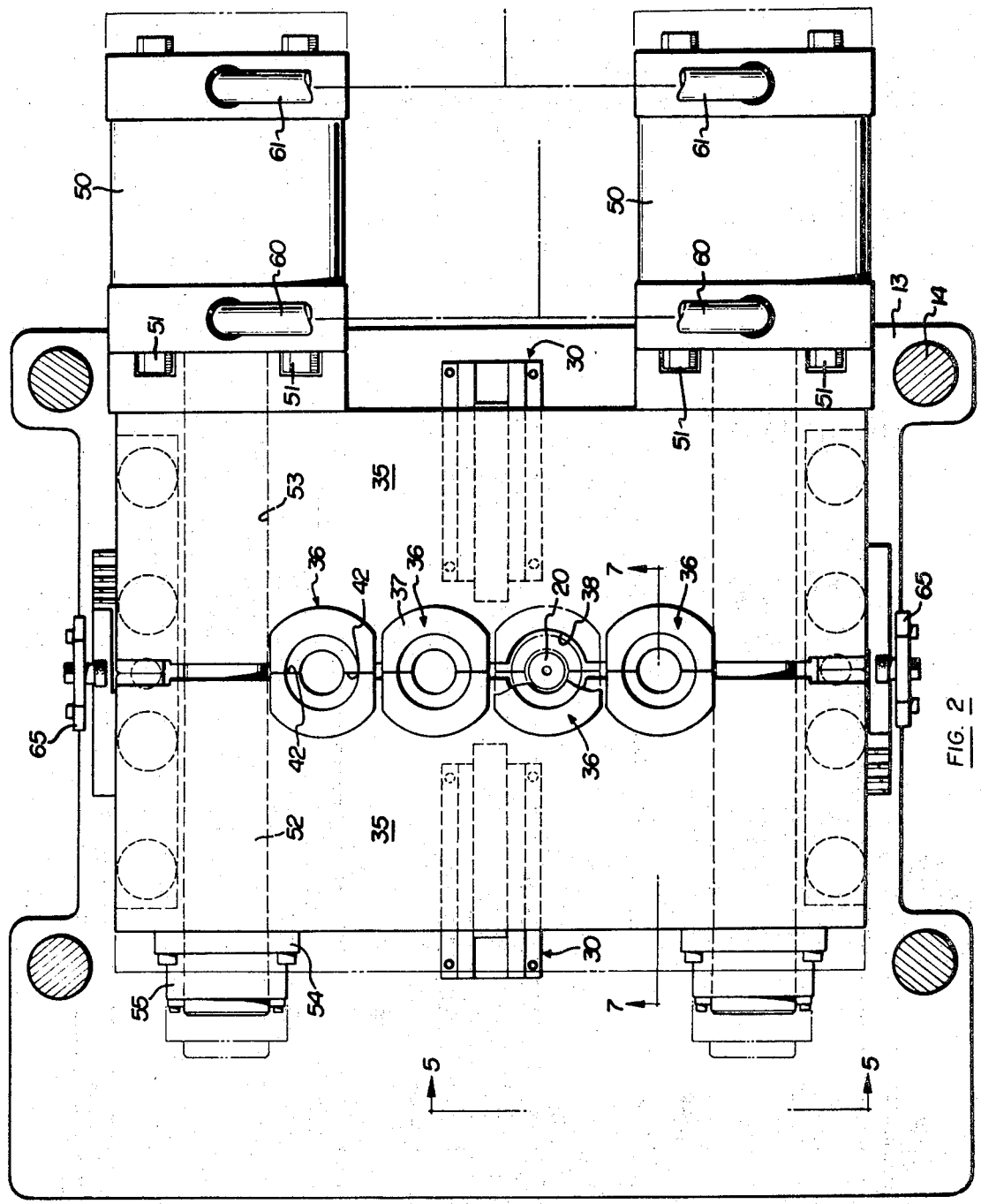
FIG. 2 is an enlarged sectional view, taken along the plane 2—2 of FIG. 1.
Figure 5:
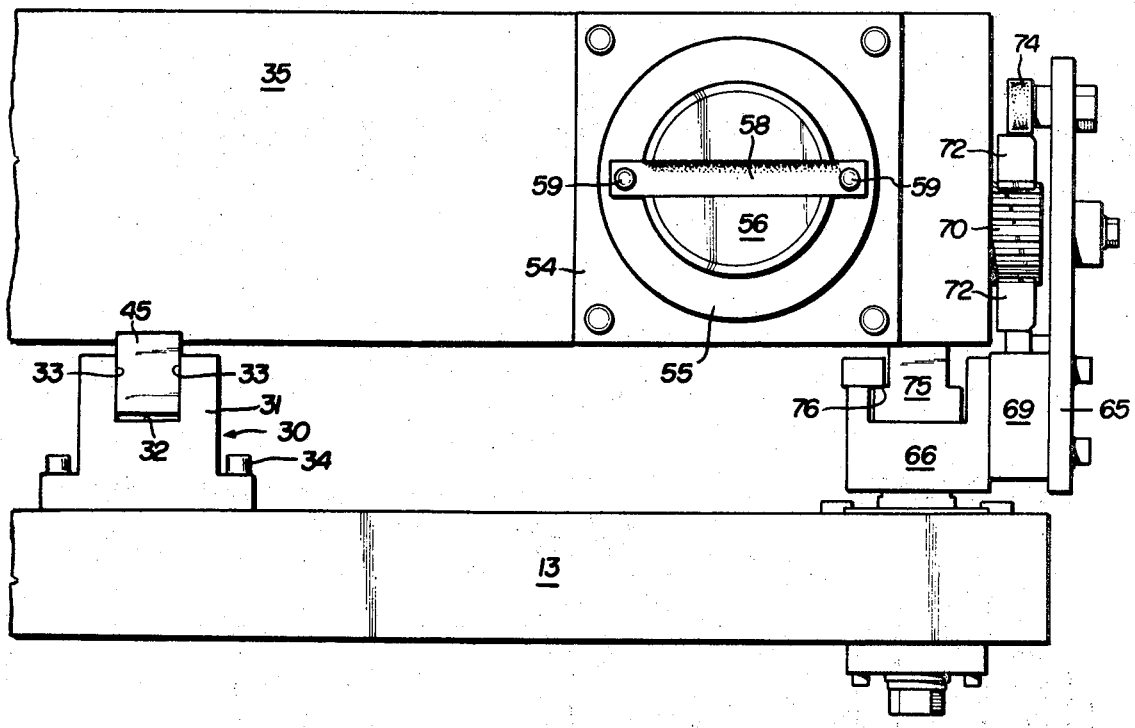
FIG. 5 is an enlarged fragmentary end view taken along the plane 5—5 of FIG. 2.

Located upon the base plate 13, fixed at a laterally central location thereof, is an upstanding lateral guide 30 (FIGS. 2, 5 and 7). A pair of such guides, indicated generally 30, are provided for guiding the horizontal displacement of the parison mold platens hereafter described. Each such guide 30 consists of a generally rectangular, longitudinally elongated block 31 provided with a central, downwardly opening rectangular recess 32 having vertical parallel guide surfaces 33. Each block is secured to the base plate 13 by suitable means, such as cap screws 34.

Overlying each of the blocks 31 is a parison mold platen 35 of somewhat less transverse extent than the width of the base plate 13. Each parison mold platen 35 constitutes a massive, generally rectangular support for a series of parison mold halves 36. Each parison mold half 36 is semi-circular in overall configuration (FIG. 2) with an upper outwardly projecting support lip 37 overlying the parison mold platen 35 to retain each parison mold 36 in a mating semi-circular recess 38 formed at the inner face of the platen 35. Each of the parison molds 36 has an inner arcuate surface 39 extending vertically through the entire extent of the parison mold section and communicating at its upper ends with a neck mold receiving recess 40 and at its bottom ends with an orifice block receiving recess 41. The confronting faces 42 of the parison mold halves 36 abut one another when the platens 37 are in their inner, closed positions as illustrated in FIGS. 2 and 7. The platens 35 are each provided on their undersurfaces with a depending guide key 45 of rectangular configuration slidably engaging the surfaces 33 in the guide block 30, thus guiding the parison platens 35 for true transverse movement relative to one another and relative to the orifice blocks 20.

Figure 3:
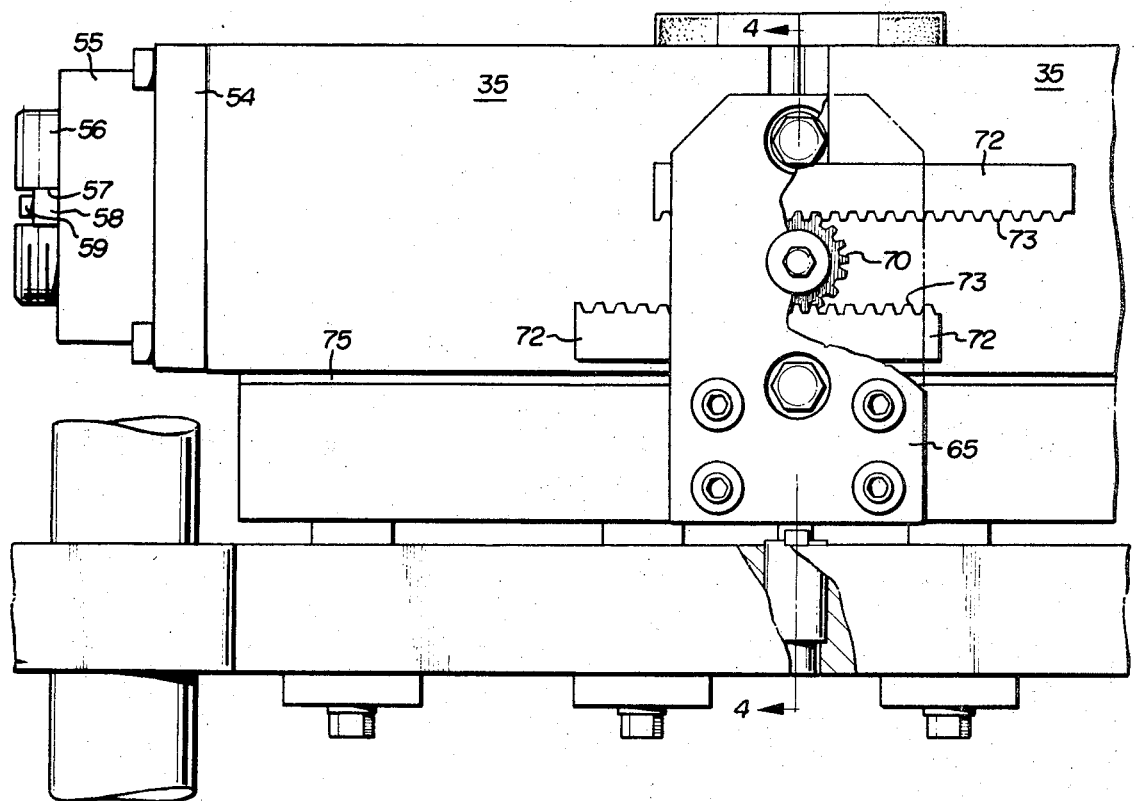
FIG. 3 is a greatly enlarged, fragmentary, elevational view, with parts broken away and in section, similar to FIG. 1.

The parison mold platens 35 are actuated for transverse displacement by a pair of fluid pressure cylinders 50 secured to one of the platens by suitable means as by bolts 51, each cylinder 50 having an interior piston (not shown) and a piston rod 52 projecting through a cylinderical aperture 53 extending transversely across each of the platens 35. That platen 35 not carrying the cylinders 50 is provided at its outer end with piston rod mounting plates 54. Each plate 54 has a guide boss 55 projecting outwardly therefrom, the plate 54 and the boss 55 being apertured and threaded to receive the threaded end 56 of the piston rod therethrough (FIG. 3). The extreme end of each of the rods 56 has a transverse slot 57 formed therein, and a locking strap 58 is inserted into the slot 57 and secured to the boss 55 by suitable means, such as cap screws 59, to prevent rods 56 from turning relative to the threaded boss 55.

To actuate the platens 35 into their closed positions of FIGS. 2 and 7, fluid under pressure is injected into the cylinders 50 through lines 60. Fluid pressure introduced through the lines 60 tends to displace the piston of each cylinder 50 to the right, as viewed in FIG. 2. Such displacement of the piston will tension the rod 52 and pull the lefthand platen 35 to the right, i.e., toward the orifice block 20. At the same time, pressure introduced to the line 60 will tend to displace the cylinder 50 to the left, thereby displacing the righthand platen 35 to the left, i.e., toward the orifice block 20.

Conversely, fluid under pressure introduced through conduit 61 will tend to displace the piston inside each cylinder 50 to the left. The piston rod 52 will be subject to compressive forces to displace the lefthand platen 35 to the left, while the cylinders 50 will tend to displace the righthand platen 35 to the right. Thus, fluid introduced through conduit 60 closes the parison molds, while fluid introduced through line 61 opens the parison molds.

To insure the concurrent and exactly identical displacement of the platens 35 towards and away from the orifice blocks 20 upon actuation of the cylinders 50, a rack and pinion equalizing arrangement is utilized. This arrangement is best shown in FIGS. 2, 3 and 4 of the drawings.

More specifically, this equalizing arrangement includes a mounting plate 65 mounted on a guide bar 66 fixed to the base plate 13 by means of a mounting pin 67. This mounting pin 67 forms a part of support cartridge 68 secured to the base plate 13, the pin 67 being vertically displaceable as will be hereafter more fully described. The mounting guide bar 66 carries an outwardly projecting mounting extension 69 to which the plate 65 is secured to project vertically upwardly therefrom.

The plate 65 carries a pinion gear 70 mounted thereon for free rotation about a horizontal axle 71 secured to the plate. Meshing with one pinion 70 are upper and lower racks 72 having teeth 73 meshing with the teeth of the gear 70. The upper rack 72 is secured to the right hand parison platen 35, while the lower rack 72 is secured to the left hand platen 35. Upon displacement of either platen 35, its rack 72 will, through engagement with the gear 70, displace the other rack 72 to exactly the same extent. Thus, neither platen 35 can move in either direction without the other platen 35 being moved to precisely the same extent and in the opposite direction through the racks 72 and the gear 70 meshing with both racks. To insure constant contact between the racks 72 and the pinion 70, back up rollers 74 are carried by the side plate 65 for engagement with the non-toothed side of each rack 72.

Figure 4:
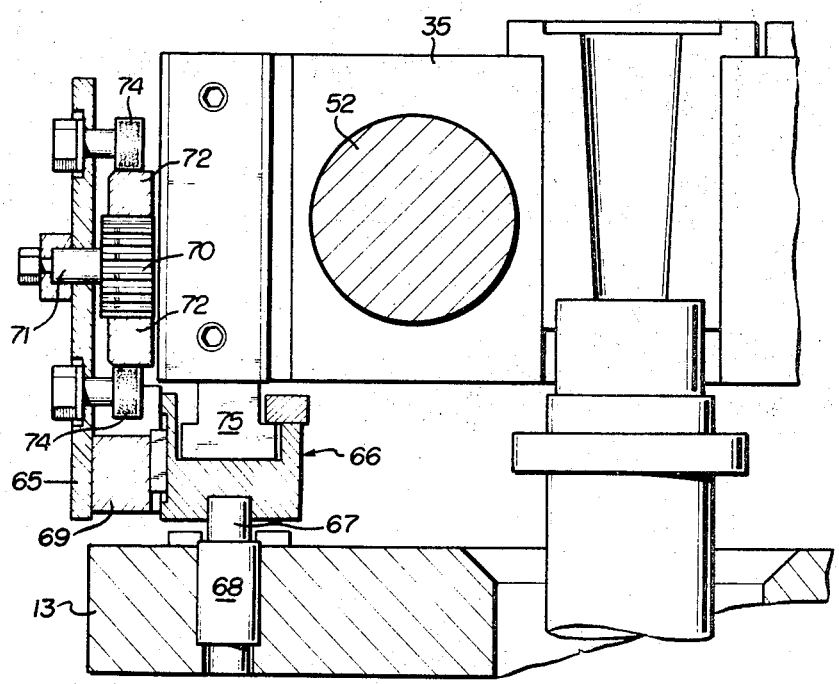
FIG. 4 is a sectional view, with parts shown in elevation, taken along the plane 4—4 of FIG. 3.
Figure 6:
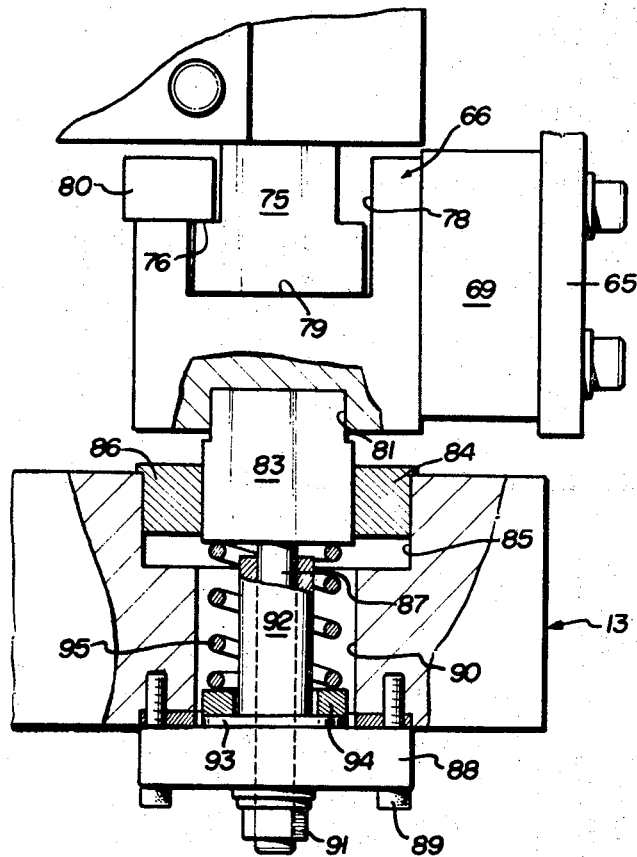
FIG. 6 is a fragmentary view, similar to FIG. 5, but on a greatly enlarged scale.

To support the platens for transverse displacement, each platen is provided, along each transverse side thereof with a depending "Tee" bar 75 (FIGS. 4, 5 and 6). These Tee bars 75 are secured by suitable means (not shown) to the undersurface of the platens 35 outside the lateral extent of the orifice blocks 20, and each Tee bar has an inner longitudinal shoulder 76. Each Tee bar 75 is received in the fixed guide 66, this guide having an open-topped continuous recess 78 therein provided with a planar, horizontal bottom surface 79 engaged by the bottom surface of the Tee bar 75, thus supporting the Tee bar and, ultimately, the platen thereon. A gib block 80 is secured to one leg of the block 66 to project inwardly over the bottom of the recess 79, this gib engaging the shoulder 76 on the Tee bar 75 to prevent vertical displacement of the Tee bar from the slot 78.

The bottom of the fixed block is provided with a series of upwardly projecting cylindrical recesses 81 into which are entered lower support pads 83, located in regularly spaced succession along the length of the support 66. Each of these pads 83 is vertically slidable in an annular collar 84 positioned in circular recesses 84 formed in the base plate 13. Each collar 84 is provided with an enlarged upper shoulder 86 overhanging the recess 85 and supporting the collar therein in its recess 85.

Each pad 83 is provided with a fixed, depending stem 87 projecting downwardly therefrom through a lower mounting plate 88 secured to the undersurface of the base plate 13 by suitable means, as by cap screws 89. Each base plate recess 85 communicates with a vertical bore 90 formed in the base plate and receiving the stem 87 therethrough. The lower extremity of the stem 87 of each pad 83 is threaded to receive an adjustment nut 91 thereon. Surrounding the stem 87 and located within the bore 90 of the base plate 13 is a stop collar 92 having a radially enlarged flange 93 at its lower end abutting against the upper surface of the mounting plate 88. Positioned on the collar flange 93 is a washer 94 and a spring 95 is confined between the washer 94 and the undersurface of the pad 83.

It will be appreciated that transverse sliding movement of the platen 35 takes place upon actuation of the cylinders 50, such transverse movement being guided by the centrally located guides 45 on each platen. The platens are supported for such transverse motion by the abutment of the bottom surfaces of the Tee bars 75 with the bottom wall 79 of the guide slides 66. The slides 66, in turn, are vertically supported upon the pads 83. These pads 83 are, in turn, supported from the base plate 13 through the springs 95. These springs 95 accommodate vertical displacement of the platens relative to the fixed base plate 13.

Turning now to FIG. 7 of the drawings, it will be seen that actuation of the neck ring block 26 vertically (upon actuation of the cylinder 24, FIG. 1) will displace the neck rings downwardly with the neck ring mold collars 97 having undersurfaces 98 contacting the surface of the recess 40 of each parison mold insert 36. The thrust of the cylinder 24 will be transmitted by the neck ring head 26 and neck ring surfaces 98 directly to the parison mold inserts 36, thus forcing the surfaces of the parison ring recesses 41 into snug abutment with the upper surface 99 of the orifice blocks 20. A dimensionally tight vertical fit will be obtained.

As above explained, thermal variations do occur during the molding cycle, and the vertical dimensional stack-up from the orifice block through the parison mold inserts 36 to the neck ring head 26 will vary accordingly. By supporting the parison mold platens 35 on the spring biased pads 83, the parison molds are capable of moving vertically to accommodate such dimensional changes. Thus, a snug, fluid tight contact is always obtained between the various mold elements and fins or other flash will not form at the juncture of either extremity of the parison mold inserts with the orifice blocks 20 or the neck ring surfaces 98, respectively.

I claim:

1. In an injection blow-molding machine having a fixed injection orifice, a pair of laterally displaceable parison molds defining an open-ended parison mold cavity adapted to be vertically aligned with said injection orifice, first power means for laterally displacing said parison molds into and out of such vertical alignment, a vertically movable neck mold aligned with said orifice and aligned with said parison mold cavity when said cavity is aligned with said orifice, second power means urging said neck mold toward said orifice and into contact with said parison molds to clamp the parison molds vertically between the orifice and the neck mold, thereby defining a completely closed parison mold communicating with said orifice, and slide support means engaging each of said parison molds on the orifice side thereof, said support means (1) supporting said parison molds for lateral displacement by said first power means and (2) separately yielding for each of said parison molds under the thrust of said second power means to insure the formation of a flash-free parison despite thermal expansion of the mold-cavity defining elements including the parison molds and the neck mold.

2. In a machine as defined in claim 1, the further improvement of said support means including a pair of parallel guides straddling said injection orifice, and underlying said parison molds, means movable with said parison molds and engaged in said guides for guiding lateral displacement of said parison molds, and a plurality of spring-urged support pins underlying each of said guides and supporting said guides for vertical yielding motion.

3. A machine as defined in claim 2, wherein said parison molds include mold cavity-defining mold halves each secured to a platen, said platens also carrying said first power means, and the means engaged in said guides is mounted on said platen, so that the platens, the mold-halves and the first power means all move as a unit under the thrust of said second power means.

4. A machine as defined in claim 3, wherein said platens each include a rack movable therewith and a pinion gear engaged with each rack is mounted on a plate secured to one of said guides, so that actuation of said first power means equally moves said platens through said rack and pinion arrangement, and said racks and said pinion are displaced vertically with said parison molds.

5. In a molding machine having an injection orifice, a pair of mold cavity-defining elements displaceable transversely relative to said orifice and first power means for relatively transversely displacing said elements, and an additional mold cavity-defining element displaceable axially relative to said orifice and second power means for relatively axially displacing said additional element, said additional element being variably positioned at its mold cavity-defining position, and said additional element bearing upon said pair of elements under the thrust of said second power means when said elements define said cavity, the improvements of support means supporting said pair of elements (1) for transverse displacement by said first power means and (2) for individual axial displacement due to the thrust of said second power means and the bearing thereon of said additional element, said support means including slide buttons fixed relative to the mold cavity location and engaging each of said pair of elements on the injection orifice side thereof, and means accommodating axial displacement of said buttons and said pair of elements under the thrust of said second means.

6. In a molding machine as defined in claim 5, the further improvements wherein said pair of cavity-defining elements and said first power means are jointly displaceable toward said orifice under the thrust of said second power means.

7. In a molding machine having a pair of relatively horizontally displaceable mold cavity-defining elements and first means for relatively horizontally displacing said elements, and upper and lower relatively vertically displaceable mold cavity-defining elements, said upper and lower elements being variably positioned at their mold cavity-defining position, and said upper and lower elements bearing upon said horizontal elements under the thrust of said second means when said elements define said cavity, the improvements of support means supporting said horizontally displaceable elements (1) for horizontal displacement by said first means and (2) for individual vertical displacement due to the thrust of said second means and the bearing thereon of said upper and lower elements, said support means including slide buttons fixed relative to the mold cavity location and engaging the undersurface of each of said horizontally displaceable elements and means accommodating vertical displacemnt of said buttons and said horizontal elements under the thrust of said means.

* * * * *